United States Patent
Jung

Patent Number: 5,874,132
Date of Patent: Feb. 23, 1999

[54] MULTI-LAYER OPTICAL RECORDING MEDIUM MANUFACTURING METHOD AND APPARATUS THEREOF

[75] Inventor: Seung-tae Jung, Sungnam, Rep. of Korea

[73] Assignee: Samsung Electronics Co.,Ltd., Suwon, Rep. of Korea

[21] Appl. No.: 521,846

[22] Filed: Aug. 31, 1995

[30] Foreign Application Priority Data

Jan. 24, 1995 [KR] Rep. of Korea ..................... 1995 1224

[51] Int. Cl.⁶ ................................. B05D 3/12; B05D 3/00
[52] U.S. Cl. ..................... 427/278; 427/162; 427/164; 427/277; 427/359; 369/272; 369/283; 369/286
[58] Field of Search ..................... 427/162, 164, 427/278, 359, 277; 369/283, 272, 286

[56] References Cited

U.S. PATENT DOCUMENTS

| | | | |
|---|---|---|---|
| 2,819,178 | 1/1958 | Haracz | 117/9 |
| 4,450,553 | 5/1984 | Holster et al. | |
| 4,888,266 | 12/1989 | Lacotte et al. | 430/141 |
| 5,126,996 | 6/1992 | Iida et al. | 369/283 |
| 5,164,219 | 11/1992 | Maeda et al. | 427/447 |
| 5,480,596 | 1/1996 | Okubo et al. | 264/1.33 |
| 5,480,681 | 1/1996 | Ver Mehren | 427/428 |

FOREIGN PATENT DOCUMENTS

| | | |
|---|---|---|
| 61-27815 | 6/1986 | Japan. |
| 62-293529 | 12/1987 | Japan. |
| 2-223030 | 9/1990 | Japan. |
| 4-49541 | 2/1992 | Japan. |
| 5-109122 | 4/1993 | Japan. |

OTHER PUBLICATIONS

M. Ross, "Taking Optical Storage to Higher Levels, "*IBM Research Magazine*, No. 2, 1994, pp. 14–17.

"3M Announces Dual–Layer Construction Process For High–Density DC–ROM, " 3M News, Nov. 14, 1994 (3 pages).

*Primary Examiner*—Shrive P. Beer
*Assistant Examiner*—Michael Barr
*Attorney, Agent, or Firm*—Burns, Doane, Swecker & Mathis, L.L.P.

[57] ABSTRACT

An optical recording medium manufacturing apparatus includes transfer means, a substrate transfer table transferred by the transfer means at a predetermined speed, a drum facing the substrate transfer table and rotating so that the speed of its outer circumferential surface is the same as the speed of a substrate transfer table, a stamp installed on the outer circumferential surface of the drum forming an information recording pit pattern, and resin supply means for injecting molten resin between the stamp and the substrate supported on the table. Since a multi-layer unit can be molded continuously by using the molten resin according to the present invention, there is the advantage of improved productivity.

3 Claims, 4 Drawing Sheets

FIG. 3 (A) (PRIOR ART) 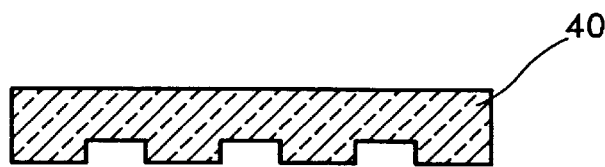
FIG. 3 (B) (PRIOR ART) 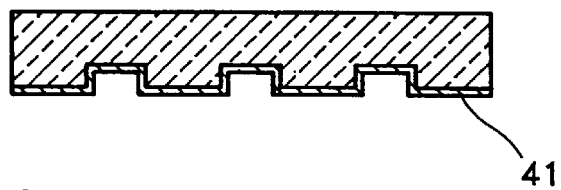
FIG. 3 (C) (PRIOR ART) 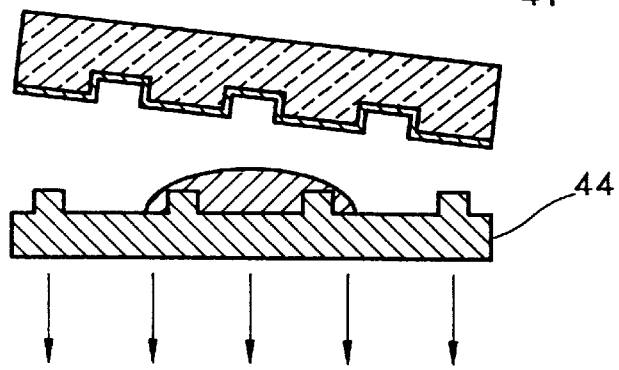
FIG. 3 (D) (PRIOR ART) 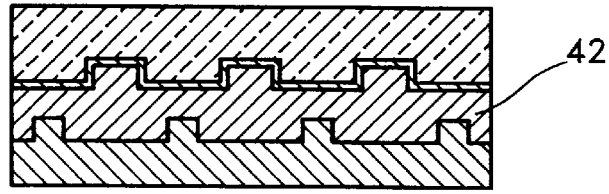
FIG. 3 (E) (PRIOR ART) 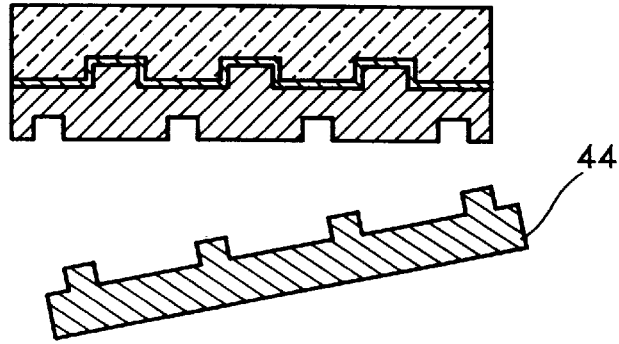
FIG. 3 (F) (PRIOR ART) 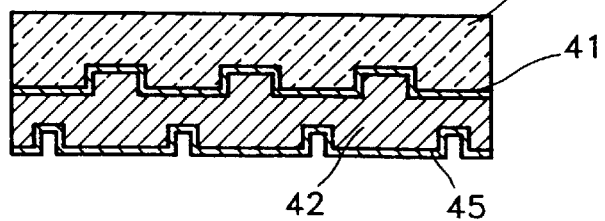

MULTI-LAYER OPTICAL RECORDING MEDIUM MANUFACTURING METHOD AND APPARATUS THEREOF

BACKGROUND OF THE INVENTION

The present invention relates to a manufacturing method and manufacturing apparatus for making a optical recording medium such as a video disk, a compact disk, or the like, and more particularly to a method of manufacturing an optical recording surface and an apparatus for manufacturing a multi-layer optical recording medium.

FIG. 1 is a schematic view showing a structure of a conventional optical recording medium.

The optical recording medium is made of general transparent resin material, and has the structure of a transparent substrate 10 having a recording surface 11 in which a pit pattern is formed on an upper surface of the transparent substrate 10. A reflection film 12 of metal is evaporatedly formed by an evaporation process, such as sputtering process or the like, on recording surface 11. A protection film 14 or a substrate is formed on the reflection film 12. The pit pattern of the transparent substrate 10 and the reflection film 12 are formed to have the same shape or contour.

An optical disk as described above is read i.e., optical information obtained, by a process in which light from optical means is irradiated to the reflecting film and reflected in a predictable manner.

However, this conventional optical disk structure has a drawback: the storage capacity of the optical disk is insufficient for storage of a large amount of information, for example, when voice information as well as picture information are required.

Accordingly, a multi-layer recording medium structure is proposed as one method of creating a large storage capacity for information.

The Philips Co. proposed a multi-layer optical recording medium structure having a reflecting layer including reflecting coefficients which are different from one another (U.S. Pat. No. 4,450,553). The Pioneer Co. proposed a multi-layer optical recording medium structure composed of silicon as a first reflecting layer and aluminum second reflecting layer. (U.S. Pat. No. 5,126,996.

FIG. 2 is a schematic view showing the multi-layer optical recording medium structure proposed by the Philips Co.

The mulyi-layer optical recording medium is composed of a transparent substrate 20 made of a thick PVC plate of about 1 mm, a first resin layer 22 formed on the first transparent substrate 20 and processed by ultraviolet rays, a first reflecting film 24 formed on the first resin layer 22, a first adhesion layer formed on first reflecting film 24, spacing sheet 28 located on the first adhesion layer 26 and formed by a thick PVC plate of about 0.15 mm, a second adhesion layer 31 formed on the spacing sheet 28, a second reflecting film 32 formed on a second adhesion layer 31, second resin layer 34 formed on the second reflecting film 32 and processed by ultraviolet rays, and a second transparent substrate 36. The first reflecting film 24 adheres to the spacing sheet 28 by the first adhesion layer 26, and second a reflecting film 32 adheres to spacing sheet 28 by the second adhesion layer 31.

The conventional optical recording medium composed as described above has an optical structure of at least two layers. In each of the optical structures, the reflecting layers have different reflecting coefficients compared to one another. The stronger an intensity of the light reflected from the reflecting layers, the more precisely read the information. The ratio of incident light to reflected light depends on the reflecting optical structure. Of the two layers of the reflecting optical structure as shown in FIG. 2, the first reflecting film 24 is formed of, for example, dielectric material so as to pass through part of a radiation beam ($\lambda$) from a light source. In such structure, the reflecting percentage of a level is needed in order to read out precisely the information in the first and second reflecting film 24,32, and it is preferable that the reflecting percentage of first reflecting film is 25–40%, and the reflecting percentage of second reflecting film 32 is 45–100%.

As shown in FIG. 3, the method of manufacturing the multi-layer optical recording medium as described above is proposed to comprise the steps of: forming a first reflecting layer 41 using silicon on a transparent substrate 40; injecting resin in a gel state in order to form a resin layer 42 on the reflecting layer 41; irradiating light in order to cure the resin after being stamped by an adhering stamp 44; and forming another reflecting layer 45 on an upper portion of a transparent resin layer 42.

After the resin is interposed between the adhering stamp 44 and transparent substrate 40, since resin is spread by pressing the adhering stamp 44 and transparent substrate 40, there is a problem that thickness distribution of the spread resin layer 42 is great. Also, since the above method executes comparatively many process steps and many man hours are necessitated by the many steps, and it was impossible to further improve productivity.

SUMMARY OF THE INVENTION

To solve the above problems, it is an object of the present invention to provide a multi-layer optical recording medium manufacturing method and an apparatus thereof capable of reducing a thickness distribution of a resin layer and improving productivity of a multi-layer optical recording medium.

To accomplish the above object, a multi-layer optical recording medium manufacturing method comprises the steps of:

forming a reflecting film on an upper surface of a transparent substrate on which first recording surface is formed;

transferring the transparent substrate on which the reflecting is formed, at a predetermined speed;

rotating a stamp at a speed same with a transfer speed of the transparent substrate while maintaining at a Predetermined spacing there between the stamp having a predetermined curvature rate and injecting melted resin between the transparent substrate and the stamp at a predetermined width.

In the multi-layer optical recording medium manufacturing method, it is preferable that injection of the melted resin having the predetermined width is realized at a point where the stamp is rotated and is closely proximate to the substrate. The substrate and the stamp have same speed with regard to an any corresponding portion.

To accomplish the above object, a multi-layer optical recording medium manufacturing apparatus for forming a resin layer having second recording surface on which first recording surface is formed, the multi-layer optical recording medium manufacturing apparatus comprising:

a substrate transfer table on which the substrate is fixedly supported;

means for transferring the substrate transfer table at a predetermined speed;

a rotating drum installed at a predetermined spacing from the transparent substrate at a portion facing the substrate transfer table, and rotating at the same speed as the substrate transfer table with the speed of a circumference surface of a rotating drum, a stamp installed on the circumference surface of the rotation drum and having an information recording layer in order to form second a recording surface; and resin supply means for injecting melted resin between the substrate supported on the table and the stamp.

BRIEF DESCRIPTION OF THE DRAWINGS

The above objects and advantages of the present invention will become more apparent by the following detailed description of a preferred embodiment thereof with reference to the attached drawings in which:

FIGS. 3A,3B,3C,3D,3E, and 3F is a cross sectional views showing schematically an optical recording medium manufacturing method that the Pioneer Co. proposed;

DETAILED DESCRIPTION OF AN EMBODIMENT OF THE INVENTION

In an optical recording medium manufacturing method according to the present invention, the method of manufacturing a multi-layer optical recording medium having at least or more two recording surfaces comprises: a step of forming first reflecting film by an evaporation process or a sputtering process on an upper surface of the transparent substrate on which a recording surface is formed; a transparent substrate transfer step of transferring the transparent substrate on which the first reflecting film is formed at a predetermined speed; a stamp rotating step of rotating the stamp at same circumferential speed as the transfer speed of transparent substrate wherein the transferred tansparent substrate and the stamp having a predetermined curvature have a predetermined spacing; a resin supplying step of supplying melted resin between the rotating stamp and the transparent substrate; a cutting step of cutting resin protruding from an edge of the transparent substrate; a cooling step of cooling the resin layer formed on the transparent substrate; a second reflecting film forming step of forming a second reflecting film on an upper surface of the transparent substrate resin layer by an evaporation process or a sputtering process; and a protecting film forming step of forming a protecting film on an upper surface of the second reflecting film.

In the optical recording medium manufacturing method as described above, it is preferable that injection of the melted resin having a predetermined width is carried out at a point where end point of the transparent substrate and the stamp face each other. The transparent substrate and the stamp should have same surface speed with regard to any portion thereof.

Figure 1:
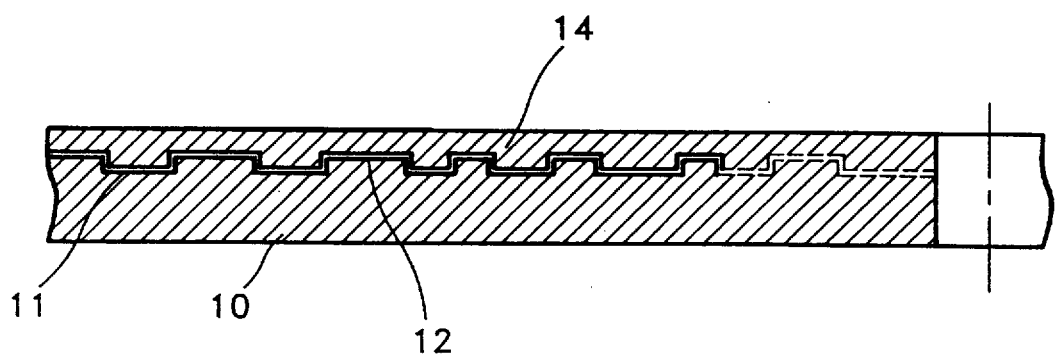
FIG. 1 is a schematic view showing a conventional optical recording medium structure.
Figure 2:
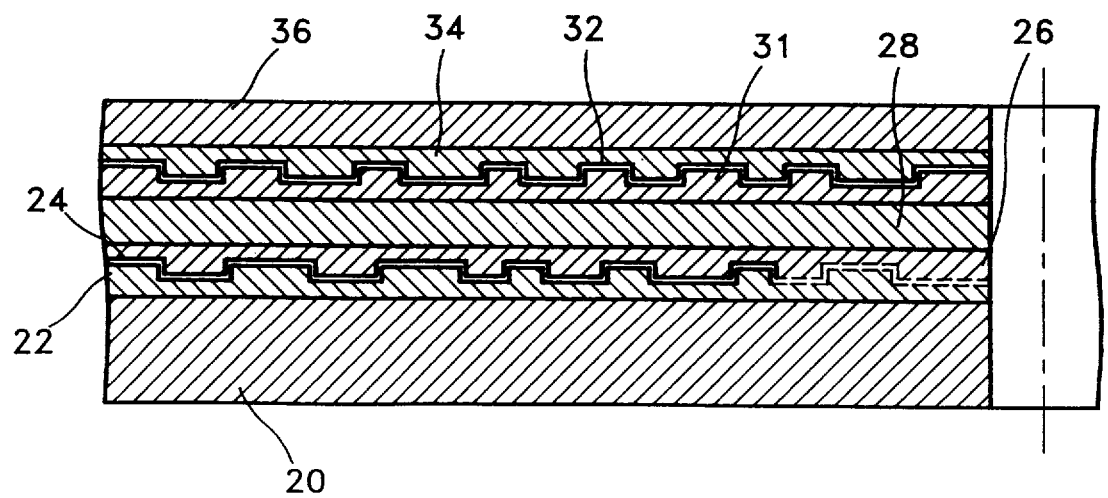
FIG. 2 is a cross sectional view showing an optical recording medium that the Phillips Co. proposed.
Figure 4:
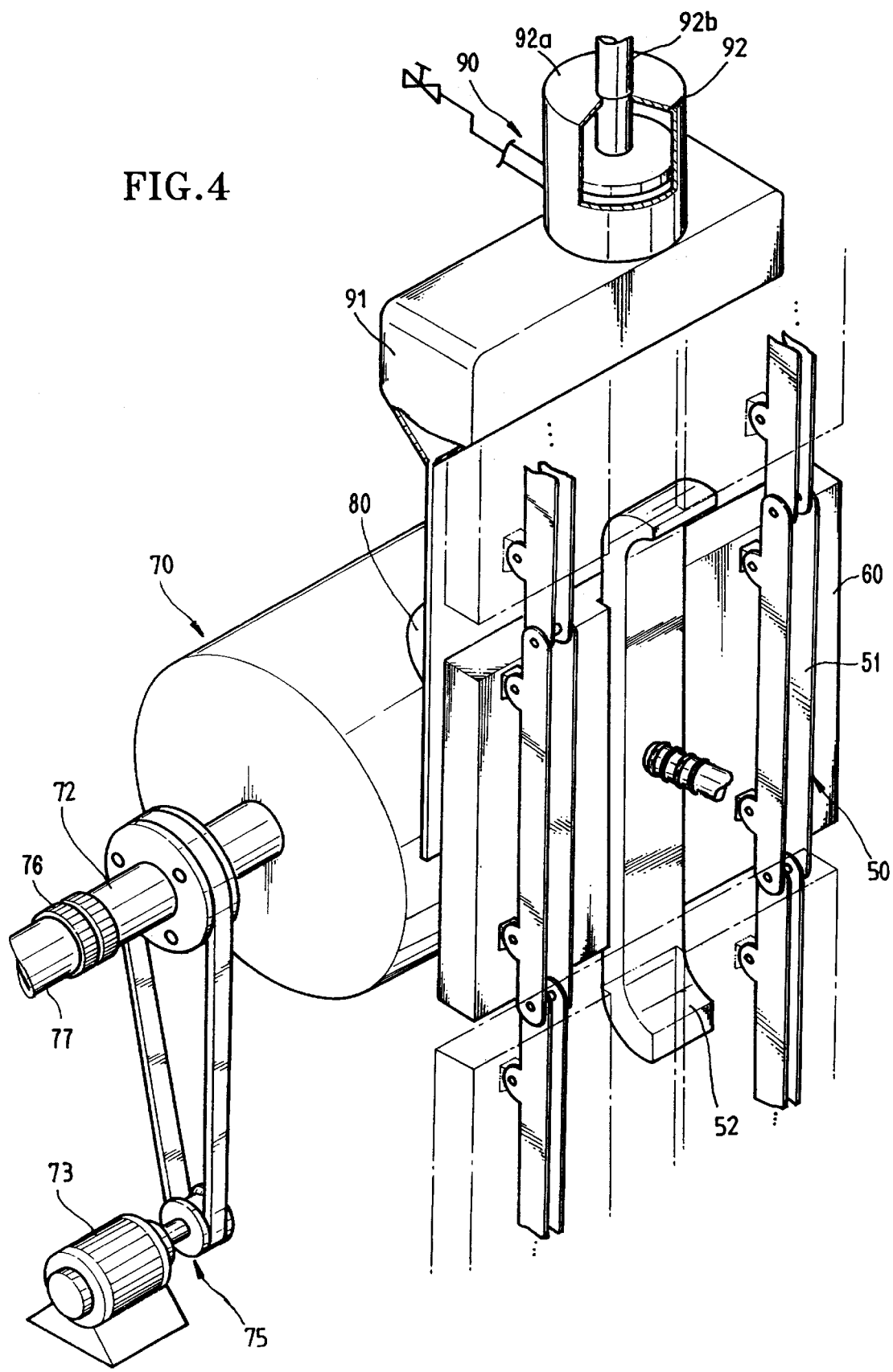
FIG. 4 is a prospective view showing an optical recording medium manufacturing apparatus according to the present invention.
Figure 5:
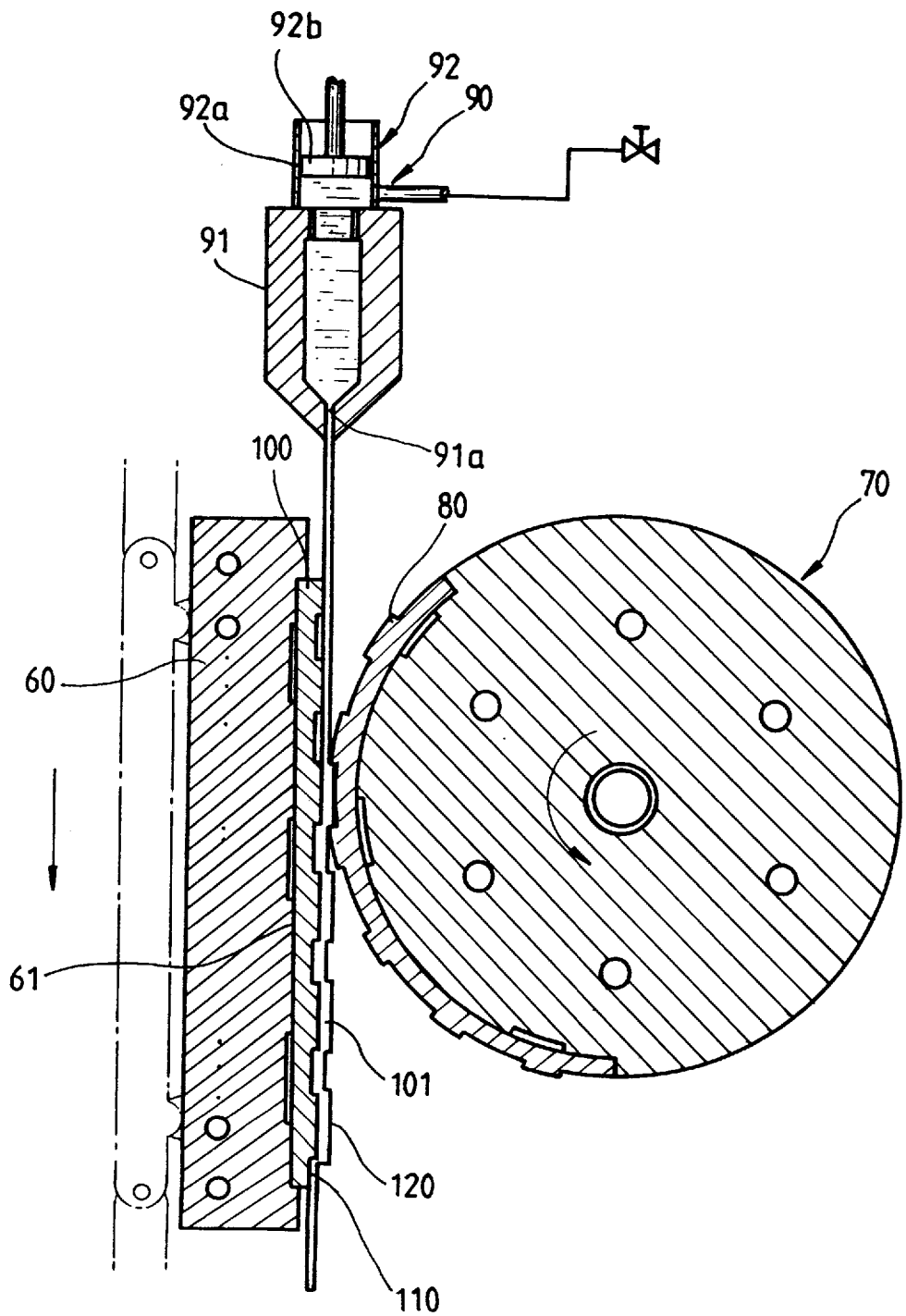
FIG. 5 is a cross sectional view showing the optical recording medium manufacturing apparatus shown in FIG. 4.

The optical recording medium manufacturing apparatus according to the present invention is for forming the resin layer having a second recording surface a first recording surface is formed on an upper surface of the transparent substrate and the first reflecting film is formed on an upper surface of the first recording surface. One embodiment according to the present invention is shown in FIGS. 4 and 5.

The optical recording medium manufacturing apparatus includes: a substrate mounting portion or jig 61 for mounting a transparent substrate 100 upon which a first reflecting film is formed on an upper portion of a first recording layer 110, substrate transfer table 60 transferred by a transfer means 50; a drum 70 installed to be facing the substrate transfer table 60 and rotating at a speed to match the speed of substrate transfer table 60, i.e., the speed of any portion of a circumference surface of drum 70 matching the speed of the transfer table 60; stamp 80 installed on the circumference surface of drum 70 and forming an information recording pit in the second recording surface 120; and resin supply means injecting the melted resin between substrate 100 supported on substrate transfer table 60 and stamp 80 by a predetermined width.

Transfer means 50 transfers the substrate transfer table 60 on which a transparent substrate 100 is mounted at constant speed, and can be ordinary lead screw or a chain conveyor. In case of using the chain conveyor, as shown in FIG. 4, a plurality of substrate transfer table 60 can be installed on a chain 51 at a predetermined spacing, and an extra guide rail 52 engages a rear surface of the substrate transfer table 60 so as not to shake when being transferred. A fixing means for fixing the substrate 100 on the mounting portion 61 is provided in each substrate transfer table 60, the fixing means can include a conventional clamp, or include a plurality of vacuum holes on a bottom surface of the substrate mounting portion 61 and vacuum clamping the transparent substrate 100. A ventilation fan (not shown) for ventilating cold air is installed on a discharge side of the transparent substrate in order to cool transparent substrate 100.

The rotating drum 70 is rotatably installed to maintain a predetermined space corresponding to the desired thickness of the resin layer 101 having the second recording surface 120 on the upper surface of the transparent substrate 100. At this time, the speed of any portion installed on the circumferential surface of the rotating drum 70 has the same speed as the transfer speed of substrate transfer table 60. It is preferable that rotating means 73 and 75 for the rotating drum 70 is a stepping motor capable of rotating clockwise and counter clockwise. It is also preferable that a cooled water line for cooling the rotating drum 70 is established in the rotating drum 70 to thereby cool the drum 70. It is further preferable that supply of the cooling water to the cooled water line is achieved through a cavity formed in rotating axis 72 of the drum 70. A cavity portion of rotating axis 72 is connected by a rotary joint 76 and supply tube 77 supplying the cooled water.

The stamp 80 for forming the second recording surface 120 in the resin supplied by a vertical supplying means 90 (which will be described below) is installed on the circumference surface of rotaing drum 70. When rotating, a beginning portion and an end portion of the stamp 80 coincides with a beginning portion and an end portion of transparent substrate 100 transferably installed on substrate transfer table 60.

The resin supply means 90 supplies resin between the substrate 100 and a stamp 80, and includes the nozzle 91 forming an injection hole 91a having wider width than width of a predetermined gap between the stamp 80 and the transparent substrate 100, and the extrusion means 92 for extrudingly pressurizing the melted resin to the nozzle 91. The extrusion means 92 includes a cylinder member 92a installed so as to communicate with the nozzle 91, and a piston member 92b reciprically moving in the cylinder member 92a. The cooled water supply line for temperature control is installed on the nozzle.

A detailed description of an operation of the optical recording medium manufacturing apparatus as constructed like above and the recording medium manufacturing method is as follows.

First, to form resin layer 101 having the second recording surface on the upper surface of the substrate (which includes) the first reflecting film on the upper surface formed on the first recording surface, transparent substrate 100 is fixed on the substrate mounting portion 61 of substrate transfer table 60, and a stamp 80 is fixed on the circumference surface of drum 70. The rotating means 75, motor 73, of drum 70 and transfer means 50 are driven while the resin is supplied from nozzle 91 of resin supply means 90. At this time, since the resin supplied between the stamp 80 and the substrate 100 is supplied to have a predetermined width and thickness, the melted resin is pressed onto substrate 100 by the stamp 80, and a predetermined pattern of pits formed by the stamp 80 is formed in the resin.

The resin compressed on the upper surface of transparent substrate 100 stamp 80 is cooled, is cured so that resin layer 101 having the second recording surface 120 is formed.

Like the above, if formation of the resin layer on the transparent substrate is finished, after separating the transparent substrate from the substrate transfer table, the resin extruded to edges of the substrate is removed and the second reflecting film is formed and the protection film on the upper surface of the resin layer so that the manufacture of the optical medium, namely the multi-layer optical recording medium is finished.

As explained hereinabove, since the optical recording medium manufacturing method and apparatus thereof according to the present invention forms the substrate unit layer by using the melted resin and the stamp, it is possible to produce the recording medium continuously, improve the productivity, and solve double refraction phenomena previously occuring in an injection molding process. In case of forming the resin layer by using the multi-layer optical disk manufacturing apparatus like the above, limitations with regard to raw material of the resin layer become smaller.

In present invention, the optical recording medium manufacturing method and apparatus thereof, were explained by one example of two-layer optical recording medium, but the present invention is not limited to the above example. In case of using a flat substrate not having the recording layer (instead of using the transparent substrate having the recording layer), not only an optical disk substrate having only one recording layer can be manufactured, but also it is possible to apply to the structure more than two layers. The present invention is not limited to the above embodiment, many alterations can be made within the scope of the present invention by those skilled in the art.

What is claimed is:

1. A multi-layer optical recording medium manufacturing method comprising:

a substrate transfer step of transferring at a predetermined speed a transparent substrate having a first recording surface;

a stamp rotating step of rotating a stamp having a predetermined curvature at a surface speed approximating the transferring speed of said transferred substrate while maintaining a predetermined distance from said transparent substrate; and a resin supply step of supplying melted resin between said substrate and said stamp, wherein said resin is deposited on said substrate and said substrate is flat when said resin is supplied between said substrate and said stamp.

2. A multi-layer optical recording medium manufacturing method according to claim 1, wherein the resin supplying step includes the steps of supplying molten resin having a predetermined width, starting the supply of the molten resin so that resin reaches one end of said stamp as it begins to face said substrate and ending the supply of the molten resin where another end of said stamp stops facing said substrate.

3. A multi-layer optical recording medium manufacturing method according to claim 1, wherein said resin is supplied having a predetermined thickness and a predetermined width.

\* \* \* \* \*